INVENTOR
PETER G. SULZER

BY

Hyman Hurwitz
ATTORNEY

Sept. 25, 1956 P. G. SULZER 2,764,643

OSCILLATORS

Filed March 23, 1954 4 Sheets-Sheet 2

BY

INVENTOR
PETER G. SULZER

ATTORNEY

Sept. 25, 1956

P. G. SULZER

OSCILLATORS 2,764,643

Filed March 23, 1954

4 Sheets-Sheet 3

INVENTOR

PETER G. SULZER

BY [signature]

ATTORNEY

Sept. 25, 1956 P. G. SULZER 2,764,643

OSCILLATORS

Filed March 23, 1954 4 Sheets-Sheet 4

INVENTOR
PETER G. SULZER

BY [signature]

ATTORNEY

United States Patent Office 2,764,643
Patented Sept. 25, 1956

2,764,643

OSCILLATORS

Peter G. Sulzer, Kensington, Md., assignor to Frank H. McIntosh

Application March 23, 1954, Serial No. 418,149
11 Claims. (Cl. 250—36)

The present invention relates generally to oscillators, and more particularly to wide band amplitude stabilized oscillators, capable of producing pure sinusoidal output.

RC oscillators, i. e. those tuned by a resistance-capacitance network, are well known, and have taken various forms. Such oscillators possess the advantages of simplicity, compactness, good frequency stability and relatively wide tuning range, and have been widely employed. In seeking to improve the general class of oscillators which rely upon an RC network to determine frequency, I have heretofore (Electronics, September 1950, a publication of McGraw-Hill Publishing Company, Inc.) disclosed an oscillator employing a pair of cascaded vacuum tubes which are cathode loaded, and in which regenerative feedback is provided by a connection, including a tungsten lamp stabilizer, from cathode to cathode of the pair of tubes. A degenerative frequency determining loop is also provided, which contains a bridged-T frequency determining network. Oscillation tends to take place at the frequency of minimum degeneration, and the positive-resistance-current characteristic of the lamp provides amplitude stabilization. The two vacuum tubes are connected in cascade, the first as an amplifier, plate loaded, and the second as a cathode follower, and output is derived from the cathode follower at low impedance.

The fact that the cathode follower tube of the oscillator operates as a single ended amplifier output stage results in appreciable even harmonic content in the output voltage. My present invention resides in the provision of a third vacuum tube connected in the cathode circuit of the second tube, as its cathode load, and in providing the second tube with anode load, so that its plate voltage may drive the control grid of the third tube. The latter thus presents a cathode load of high dynamic resistance, and a relatively high current is available to drive the stabilizing lamp, or an external load. In addition, a form of push-pull operation is obtained, since the anode current of the second tube increases as the anode current of the third tube decreases, and vice versa. This results in a reduction of even-harmonic distortion in the output of the oscillator.

As a further feature, the feed-back from the anode of the second tube to the control grid of the third tube constitutes negative feed-back, which further decreases distortion, and decreases the effective output impedance of the system while increasing its input impedance.

I have found that oscillators constructed in accordance with my invention have extremely low harmonic content, of the order of .03 per cent, or lower, excellent frequency stability and constancy of output voltage, and further that these desirable attributes are attainable at higher frequencies, or over wider frequency range, than has heretofore been possible in RC oscillators, largely because of the increased effective input impedance of the output stage of oscillators constructed in accordance with the present invention.

The oscillator of the present invention may be arranged to utilize transistors, in place of vacuum tubes, and more particularly to employ junction transistors in various circuit arrangements, paralleling those employing vacuum tubes, and retaining the operating features and advantages hereinabove attributed to the basic circuit.

As a further modification, I may locate the amplitude stabilization device at various positions in the circuit, and may employ a thermistor or a tungsten filament lamp, as desired, for amplitude stabilization, by suitable location thereof in the circuit.

As still a further modification, I may include anti-hunt circuitry in the amplitude stabilization network of the oscillator, to reduce or eliminate amplitude hunting consequent on change of operating conditions of the oscillator, and due to the thermal lag of the amplitude stabilization element.

It is, accordingly, a broad object of my invention to provide a novel RC oscillator, having a high order of freedom from harmonic distortion, low output impedance, high output power, and high amplitude stability.

It is a further object of my invention to provide an RC oscillator having an output stage which operates effectively in push-pull relation, with consequent reduction in even harmonic distortion.

A further object of the invention resides in the provision of an RC oscillator having an output stage consisting of a pair of series connected unilateral conducting devices.

Another object of my invention resides in the provision of a novel output stage for an RC oscillator, which possesses high input resistance, low output resistance, low harmonic distortion in its output signal, and high power capability.

Still another object of the present invention resides in the provision of a novel stabilized RC oscillator employing transistors as amplifying elements.

It is another object of my invention to increase the amplitude stability of RC oscillators by the inclusion of a circuit which serves also to reduce distortion of wave form in the output of the oscillator.

Another object of the invention resides in the provision of various expedients for stabilizing the amplitude of an oscillator having both regenerative and degenerative networks.

A further object of my invention resides in the provision of a system for reducing hunting of the amplitude stabilization circuit of an RC oscillator, which is primarily stabilized by an element having a substantial co-efficient of resistance variation with temperature.

Still further features, objects and advantages of my invention will become apparent upon consideration of the following detailed description of specific embodiments thereof, especially when taken in conjunction with the accompanying drawings, wherein.

Figure 1:
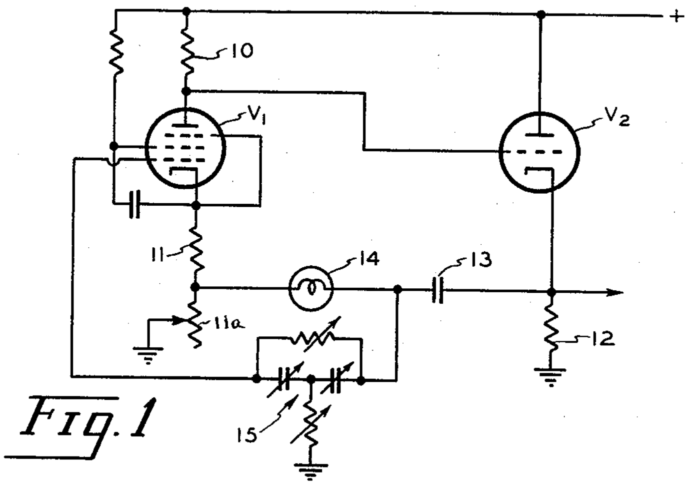
Figure 1 is a schematic circuit diagram of an RC oscillator, utilizing vacuum tube type unilateral control devices, and exemplifying prior art.

Referring now more particularly to the accompanying drawings, and particularly to Figure 1 thereof, there is illustrated in Figure 1 a known oscillator, which is modified in accordance with the present invention as illustrated in Figures 2–11, in order to improve its performance. In Figure 1, $V_1$ is a conventional voltage amplifier pentode having a plate load 10, and two series connected unbypassed cathode resistances 11, 11$a$, the latter being variable. $V_2$ is a cathode follower output triode having a cathode load 12. The plate of pentode $V_1$ is connected directly with the control grid of triode $V_2$, so that current flow in tubes $V_1$ and $V_2$ are respectively of opposite phase. An a. c. connection is supplied, via coupling condenser 13, and tungsten filament lamp 14, from the cathode of triode $V_2$ to the junction of the cathode resistances 11, 11$a$ so that the voltage of the cathode of pentode $V_1$ is in phase with the voltage at the cathode of triode $V_2$. This constitutes a regenerative connection. The lamp 14 possesses resistance which increases with temperature, i. e. has a positive temperature co-efficient of resistance. Therefore, feed-back through the lamp tends to decrease as current through the lamp increases.

A negative feed-back loop exists from the cathode of triode $V_2$ through coupling condenser 13, and via a bridged-T network 15 to the control grid of the pentode $V_1$. It is known that a wide variety of bridged-T networks exist, and it is contemplated that any suitable one of these may be employed, in place of the specific network 15 illustrated, in accordance with the judgment of the circuit designer.

If the positive feed-back through the lamp 14 exceeds the negative feed-back through the bridged-T network 15, oscillations will commence, and will exist at the zero-phase-shift frequency of the network 15. As the amplitude of the oscillations increases the resistance of the lamp 14 increases because of its positive temperature co-efficient of resistance, reducing the voltage available across resilstance 11$a$, until an equilibrium condition is reached such that an increase of oscillator output would cause a reduction of net positive feedback.

Variation of the value of variable resistance 11$a$ may be employed to vary the output amplitude of the oscillator, by varying the value of regenerative voltage applied to pentode $V_1$.

In the oscillator of Figure 1 the cathode follower output stage $V_2$ is operated as a single ended amplifier, which for that reason has appreciable even-harmonic content in its output voltage. In addition, a portion of the signal power of triode $V_2$ is lost in its cathode-load resistance 12, which reduces the power available to operate the stabilization lamp 14. These defects and other defects of the system of Figure 1, are overcome in the herebelow described embodiments of my invention.

Figure 2:
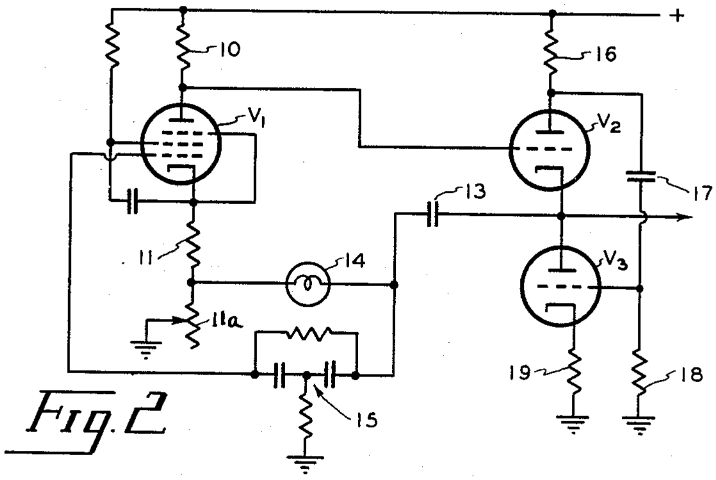
Figures 2–5 are schematic circuit diagrams respectively, of modifications of the basic system of Figure 1, utilizing vacuum tubes as unilateral control devices, and including my improvements.

A first embodiment of the present invention is illustrated in Figure 2 of the accompanying drawings. It will be noted that the cathode resistance 12 of triode $V_2$, Figure 1, is replaced by a triode $V_3$, in Figure 2, having its anode connected directly to the cathode of triode $V_2$. An anode resistance 16 is connected in series with the anode of triode $V_2$. The anode of triode $V_2$ is coupled with the control grid of triode $V_3$, by means of coupling condenser 17, the control grid being connected to ground via resistance 18. The cathode of triode $V_3$ is connected to ground via an un-bypassed resistance 19, which introduces a suitable bias and also provides some degeneration in triode $V_3$.

It will now be noted that the relatively high dynamic anode resistance of triode $V_3$ is employed as a load resistance for the cathode circuit of triode $V_2$. This permits more of the signal current of triode $V_2$ to be used for supplying current to lamp 14, and to an external load. In addition, as the anode current of triode $V_2$ increases, the anode current of triode $V_3$ decreases, since an increase in current in triode $V_2$ causes a decrease in its anode voltage, which decreases the grid voltage of triode $V_3$, and hence its plate current.

The net result is, that triodes $V_2$ and $V_3$, considered as an output stage, operate in push-pull or balanced relation, resulting in a reduction of even-harmonic distortion.

Moreover, the feed-back from the anode of triode $V_2$ constitutes negative feed-back. This may be made evident by considering that a positive voltage at the control grid of triode $V_2$ produces a positive voltage at the cathode of triode $V_3$, via the increase in resistance of triode $V_3$, which takes place as its grid voltage goes more negative. This negative feed-back decreases the distortion in the output stage consisting of triodes $V_2$ and $V_3$, and increases the effective input impedance. The increased effective input impedance increases amplitude and frequency stability at high frequency, and thus permits higher frequency operation. The local negative feed-back in the output stage results in very low harmonic content in the output, of the order of .03 per cent, or less. The stabilizing effect of the lamp 14 is enhanced by the action of triode $V_3$.

Figure 3:
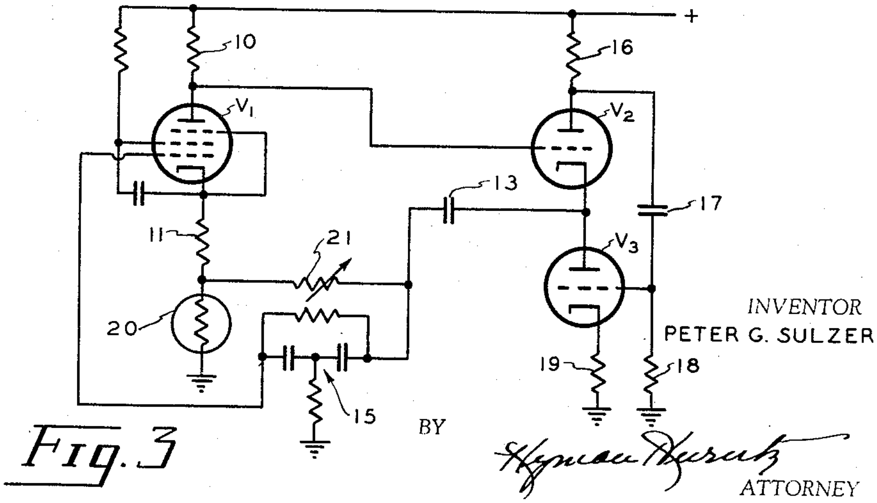

As a further modification, illustrated in Figure 3 of the accompanying drawings, a thermistor 20 is employed as an amplitude stabilizing element. To this end the thermistor 20 is connected in the cathode circuit of pentode $V_1$, and is coupled in series with condenser 13 via variable resistance 21. The thermistor 20 is a negative temperature co-efficient device, so that as its resistance decreases with increasing output voltage, the positive feed-back of the system will decrease. In other respects, the embodiments of my invention illustrated in Figures 2 and 3 operate in similar manner, and possess the same advantages. Variations of resistance 21 now serve to control output amplitude.

Figure 4:
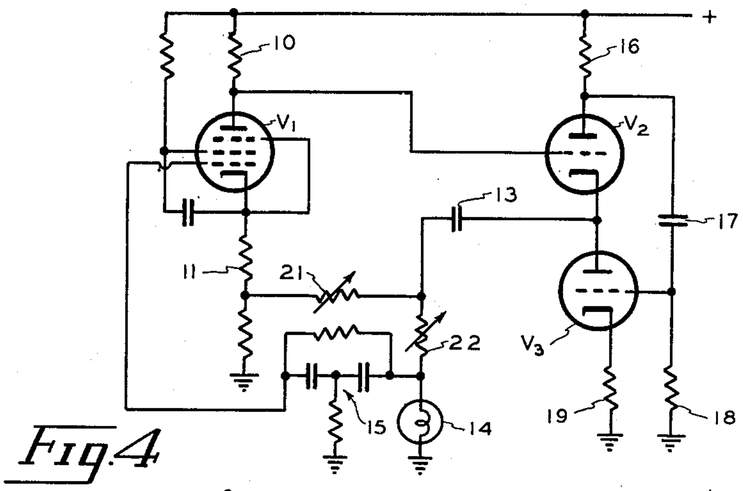

In the system illustrated in Figure 4 of the accompanying drawings, a tungsten filament 14 is employed for amplitude stabilization. The lamp 14 is connected, however, in shunt to the negative feed-back loop of the oscillator, so that as output voltage increases and the resistance of the lamp increases, the current flow to bridged-T network increases and thus the value of negative feed-back, which stabilizes the amplitude of oscillation. A resistive connection 21 is provided between condenser 13 and cathode resistance 11, which controls regeneration and hence output amplitude of the oscillator. The lamp 14 is connected in shunt to the bridged-T network 15, and may be connected to the condenser 13, via a voltage dropping resistance 22. Positive feed-back is thus relatively constant, but negative feed-back is amplitude stabilized by lamp 14. It will be noted that variation of resistance 22 may be employed to control oscillator output amplitude.

Figure 5:
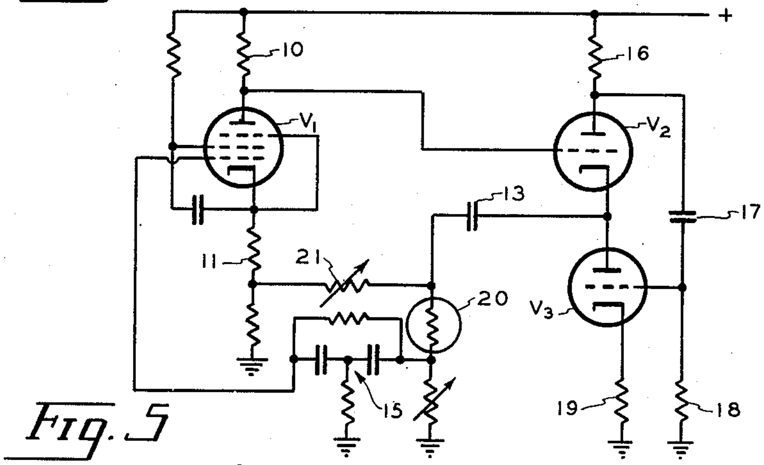

As a further embodiment of my invention, illustrated in Figure 5 of the accompanying drawings, the thermistor 20 may be connected in the negative feed-back path, by connecting same in series with the bridged-T network 15, so that an increase in output will reduce the resistance of the thermistor 20, and thereby increase the voltage across the network 15, and thus increase the negative feed-back voltage. In order to provide a voltage divider, the thermistor 20 is connected to ground via resistance 23, the bridged-T network being in shunt to the latter. Resistance 23 may now be employed as an output control.

The embodiments of my invention illustrated in Figures 4 and 5 respectively are equivalent in operation, the lamp 14 in Figure 4 replacing the voltage divider resistance 20 in Figure 5, and the thermistor in Figure 5 replacing the voltage divider resistance 22 in Figure 4. The interchange is, of course, made necessary by the fact that the lamp 14 has a positive co-efficient of resistance with temperature, while the corresponding co-efficient in the case of the thermistor 20 is negative.

It has been found that the amplitude stabilization process, in circuits of the type illustrated in Figures 1–5, inclusive, involves a form of amplitude hunting at relatively low frequency since as the lamp temperature increases because of an amplitude increase of the oscillator, the lamp resistance exceeds that required to establish equilibrium. Consequently, the amplitude starts to decrease, and the lamp resistance decreases in following relation. However, the lamp possesses considerable thermal inertia, and will in consequence of that fact decrease in resistance below that required to establish equilibrium. Several cycles of relatively slow amplitude variation have been found to subsist after any adjustment of the oscillator, either as respects amplitude or frequency of output, or on first supplying power to the oscillator.

Figure 6:
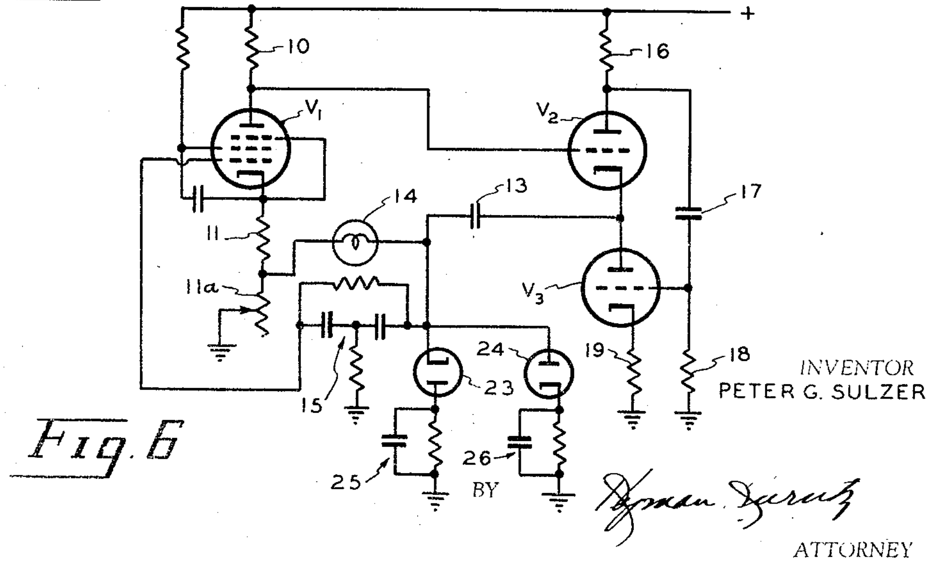
Figure 6 is a schematic circuit diagram of a modification of the system of Figure 2, wherein is provided anti-hunt circuitry in the amplitude stabilization loop of Figure 2.

The magnitude and duration of the hunting effect may be radically reduced by utilization of the circuit devices of Figure 6 of the accompanying drawings. Referring to Figure 6, a pair of cross-connected biased diode limiters 23, 24, are connected in series respectively, with parallel RC networks 25, 26, having time constant small relative to the thermal lag of lamp 14, but longer than the period of the oscillator at its lowest frequency. Under equilibrium conditions the condenser C of RC networks 25, 26, require respectively a negative and a positive potential, which are equal in magnitude to the peak magnitude of the oscillations. The diodes 23, 24, remain non-conductive, and the system operation remains unaffected. If a sudden increase of signal output amplitude takes place, for any reason, heavy clipping of both half cycles of the output signal occurs, by conduction of the diodes 23, 24. This largely prevents hunting in one sense or direction, and operates practically instantaneously, regardless of the time lag of the operation of lamp 14. Since the lamp 14 cannot be supplied with a heavy sudden surge of current, or a rapidly increasing current, its resistance value cannot overshoot, and the hunting action is largely damped out. In a broad sense the clipped network comprising diodes 23, 24, is an amplitude stabilizing network which operates extremely rapidly unidirectionally, i. e. to prevent increase of amplitude, and also which operates transiently, i. e. only during the increase. It operates then, to absorb transient increases of voltage, from any preceding stable value, and is then more effective the more rapid the increases.

Clearly, the anti-hunting expedient of Figure 6 may be applied to any of Figures 1–5 inclusive, and the illustration as applied in Figure 6, i. e. to the embodiment of my invention illustrated in Figure 2, is for example only.

Figure 7:
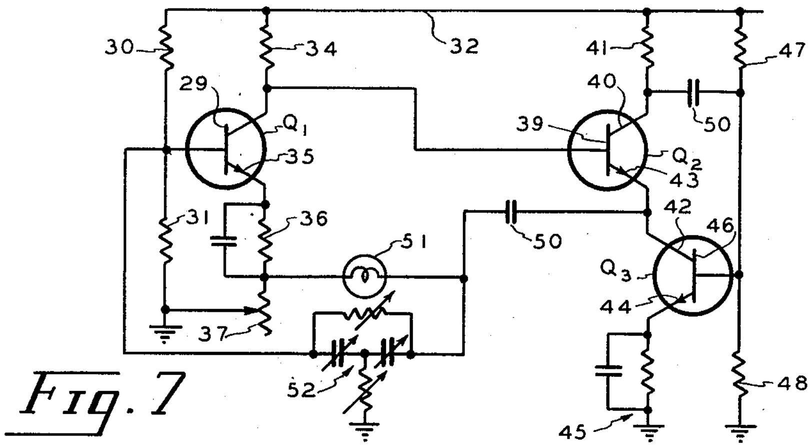
Figures 7–11 inclusive are circuit diagrams of oscillators in accordance with Figures 2–6, respectively, but employing transistors as unilateral control devices.

Referring now more particularly to Figure 7 of the accompanying drawings, there is illustrated a modification of the system of Figure 2, in which junction transistors are employed, rather than vacuum tubes as unilaterally conducting control devices.

The junction transistor $Q_1$ is connected at its base 29, to the mid-point of a pair of resistances 30, 31, the latter connected in series between the voltage supply lead 32 and ground. The collector 33 of the transistor $Q_1$ is connected in series with a resistance 34 to the voltage supply lead 32, and the emitter 35 is connected via a fixed resistance 36 and a variable resistance 37 to ground. The resistance 36 may be shunted by a smoothing condenser 38.

The base 39 of junction transistor $Q_2$ is connected directly with the collector 33 of transistor 33, and consequently is driven by the voltage appearing across resistance 34. The collector 40 of transistor $Q_2$ is connected to the voltage supply lead 32 via resistance 41, across which is available voltage output deriving from transistor $Q_2$ in response to its base drive.

A third transistor, $Q_3$, is connected with its collector 42 directly in circuit with emitter 43 of transistor $Q_2$, and with its emitter 44 connected to ground via an RC parallel network 45, arranged to supply bias for the emitter. The base 46 of the transistor $Q_3$ is connected to the junction of a pair of resistors 47, 48, which extend in series from the voltage supply lead 32 to ground, and a condenser 50 is connected from the collector 4 of transistor $Q_2$ to the base 46 of the transistor $Q_3$.

The various resistors are selected to provide proper operating voltages for the elements of the transistors $Q_1$, $Q_2$, $Q_3$, in accordance with principles well understood in the art of transistor circuit design.

It will now be clear that the dynamic collector resistance of transistor $Q_3$ is used as a load resistance for the emitter 43 of transistor $Q_2$, and that the base 46 of the transistor $Q_3$ is driven by the voltage available at the collector of transistor $Q_2$. Two consequences ensue. First, the emitter 43 of transistor $Q_3$ operates into a relatively high internal load, which increases the output power or signal current available to an external load. In addition, a form of push-pull operation is attained, in which the collector current of transistor $Q_2$ increases as the collector current of transistor $Q_3$ decreases, and vice versa, resulting in reduction of even-harmonic distortion. Moreover, feed-back from the collector 40 of transistor $Q_2$ is negative feed-back, since an increase of voltage at the base of transistor $Q_2$ will produce a positive voltage at the emitter of transistor $Q_2$ via the amplifier comprising transistor $Q_3$.

Transistors $Q_2$, $Q_3$ together constitute an output stage for the oscillator, and the negative feed-back of the stage decreases the distortion of the stage, increases its effective input impedance, thus permitting greater gain, and decreases the effective output impedance.

In order to effect self-oscillation of the system a stabilized positive feed-back loop is provided, in the form of a condenser 50 and tungsten filament amplitude stabilizing lamp 51, in series between the collector 42 of transistor $Q_3$ and the junction point of the resistances 36, 37 in the emitter circuit of transistor $Q_1$. At the same time a frequency determining degenerative network is supplied, in the form of a bridged-T network 52 coupled via condenser 50, from the collector 42 of transistor $Q_3$ to the base 29 of transistor $Q_1$.

Figure 8:
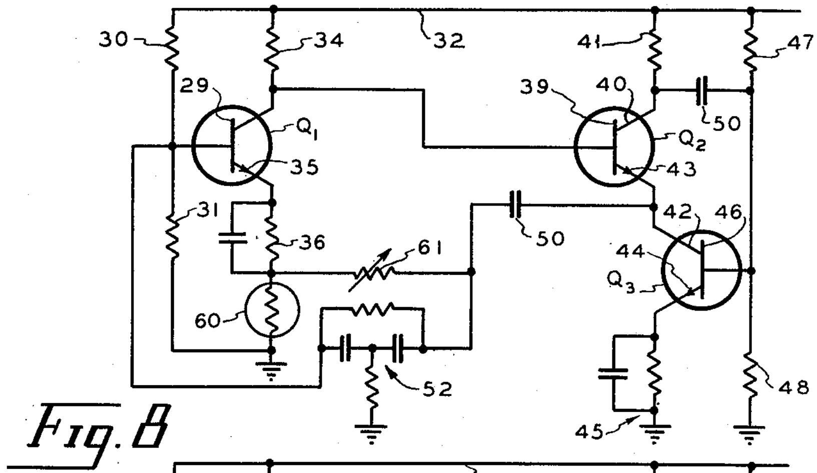

The system of Figure 8 is generally similar to the system of Figure 7, except in respect to the mode of stabilizing. In the embodiment of my invention illustrated in Figure 8 a thermistor 60 is included in series with the emitter to ground circuit of transistor $Q_1$, and the connection from condenser 50 to bias resistance 36 provided via a variable resistance 61 of substantially zero temperature co-efficient. In this respect the system of Figure 8 parallels that of Figure 3.

Figure 9:
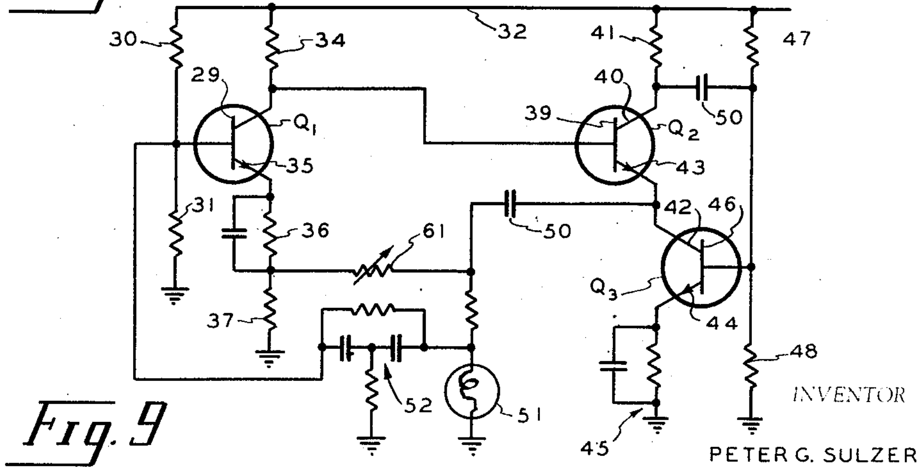
Figure 10:
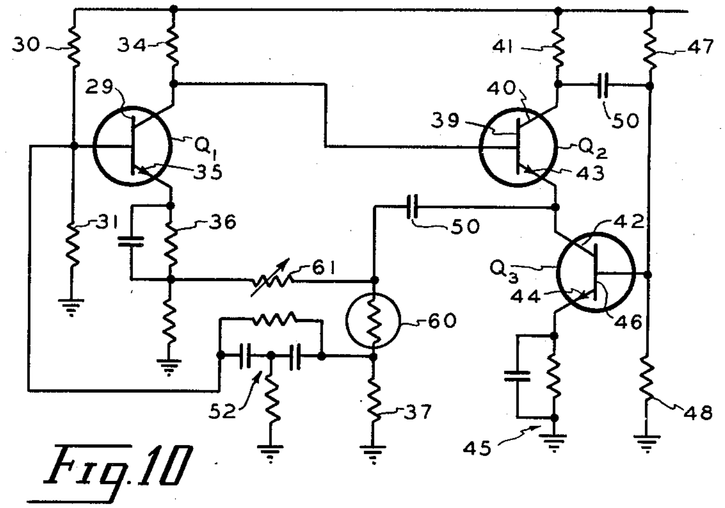
Figure 11:
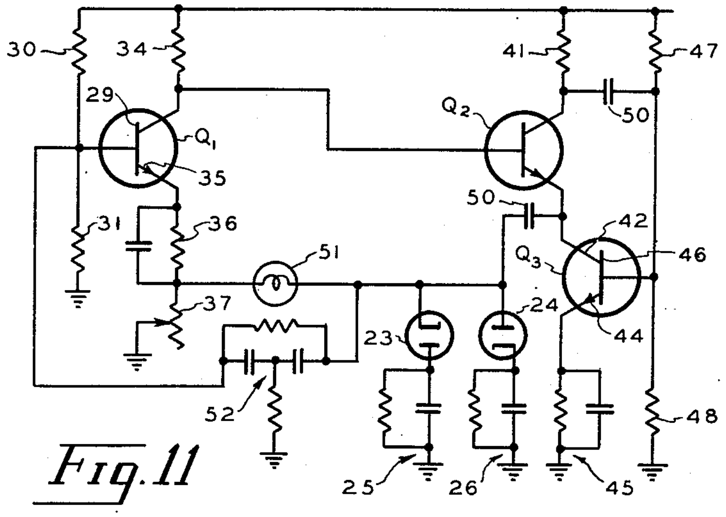

Similarly, the embodiment of my invention illustrated in Figure 9 parallels that of Figure 4, in that a tungsten element lamp 51 is employed for amplitude stabilization, included in shunt with the bridged-T network 52. Further, the embodiments of my invention illustrated in Figures 10 and 11 parallel those of Figures 5 and 6, except for the substitution of transistor control devices for vacuum tube control devices, following the teaching of Figure 7. Further detailed description of the construction of these embodiments of my invention is, therefore, dispensed with.

It will be recalled that the operation of a grounded emitter junction transistor, driven at its base, is similar to that of a grounded cathode vacuum tube, circuitwise, but that account must be taken of the low input impedance of the transistor in designing useful circuits. It is this fundamental transistor circuit which is employed through the present invention. In the circuits of the present invention, the input circuit of transistor $Q_1$ loads the bridged-T network 52. This loading is decreased radically, however, in the present circuits by the feed-back to the emitter. The fact that feed-back power may be increased, by the novel output stage of my invention, is particularly important in the case of transistor circuits, to enable adequate amplitude stabilization, and transistor circuits being prone to non-linearity the specific output stage, having effectively push-pull operation and negative feed-back, is desirable if freedom from harmonic output, or purity of wave form, is to be obtained. In practical embodiments of the present invention, constructed with commercially available transistors, excellent performance was attained over a wide band of operation. Harmonic distortion of the order of .03 per cent and lower was attained, and frequency and amplitude stability was excellent, while the range of stable operation, both in respect to amplitude and frequency was radically increased.

While I have described and illustrated various modifications of the present invention it will be clear that variations thereof may be resorted to in respect of circuit details, and of general arrangement, without departing from the true spirit and scope of the invention as defined in the appended claims.

What I claim is:

1. An RC oscillator, comprising a first amplifier having at least two input terminals and an output terminal, a second amplifier having an output terminal, said second amplifier including a pair of series connected unilateral control devices, means for driving said unilateral control devices in 180° out-of-phase relation in response to alternating current signals on said output terminal of said first amplifier, the output terminal of said second amplifier subsisting at the junction of said series connected control devices, a degenerative feedback loop extending from the output terminal of said second amplifier to one of the input terminals of said first amplifier, said degenerative feed-back loop including circuit means for determining the frequency of oscillation of said oscillator, a regenerative feedback loop extending from the output terminal of said second amplifier to the other input terminal of said first amplifier, and an amplitude stabilizing thermal element connected in one of said feedback loops.

2. The combination in accordance with claim 1 wherein said circuit means is a bridged-T network.

3. The combination in accordance with claim 1 wherein said unilateral control devices are vacuum tubes.

4. The combination in accordance with claim 1 wherein said unilateral control devices are transistors.

5. The combination in accordance with claim 1 wherein said first amplifier is a plate loaded vacuum tube, and wherein said series connected unilateral control devices are series connected vacuum tubes having each an anode, a cathode, and a control electrode.

6. The combination in accordance with claim 1 wherein said first amplifier includes only transistors as amplifying elements, and wherein said second amplifier includes a pair of series connected transistors having control elements.

7. The combination in accordance with claim 1 wherein said amplitude stabilizing thermal element has inherent thermal inertia and means comprising cross-connected rectifying elements for reducing hunting of the amplitude of the output voltage of said oscillator due to the thermal inertia of said element.

8. An oscillator comprising a first amplifier including a unilateral control device having a first control electrode, a first emitter electrode, and a first electron collector electrode, a second amplifier comprising a second unilateral control device having a second control electrode, a second emitter electrode and a second collector electrode, said second amplifier further including a third unilateral control device having a third control electrode, a third emitter electrode and a third collector electrode, means connecting said first collector electrode with said second control electrode, a source of supply voltage, means connecting said second collector electrode to said source of supply voltage, means connecting said second emitter electrode to said third collector electrode, means connecting said third emitter electrode to a point of reference potential, means A. C. coupling said second collector electrode to said third base electrode, and means for A. C. coupling said third collector electrode respectively to said first collector electrode and to said first control electrode via feedback paths having relatively different phase shifts at different frequencies, and an amplitude responsive thermal element connected in one of said feedback paths.

9. The combination in accordance with claim 8 wherein said temperature co-efficient is positive.

10. The combination in accordance with claim 8 wherein said temperature co-efficient is negative.

11. In a relatively high frequency oscillator having a feedback loop, an amplitude stabilizing element for said oscillator comprising a temperature sensitive circuit in said feedback loop, said circuit having sufficient thermal lag to lead to relatively slow oscillation of amplitude of signal output of said oscillator, and means for preventing said relatively slow oscillation comprising means for shunting only transient relatively rapid rises of said amplitude of signal output around said temperature sensitive circuit.

References Cited in the file of this patent

UNITED STATES PATENTS

| | | |
|---|---|---|
| 2,358,428 | White | Sept. 19, 1944 |
| 2,394,018 | Shank et al. | Feb. 5, 1946 |
| 2,568,868 | Pratt | Sept. 25, 1951 |
| 2,590,282 | Thompson | Mar. 25, 1952 |
| 2,661,398 | Cooper et al. | Dec. 1, 1953 |
| 2,727,993 | Epstein | Dec. 20, 1955 |

OTHER REFERENCES

Article: "A Note on a Bridged-T Network," by Sulzer, pages 819 to 821 of Proc. IRE, for July 1951.

Article: "Duality as a Guide in Transistor Circuit Design," by Wallace et al., pages 127 to 164 of The Transistor, published by Bell Labs., Dec. 4, 1951.